Patented June 24, 1930

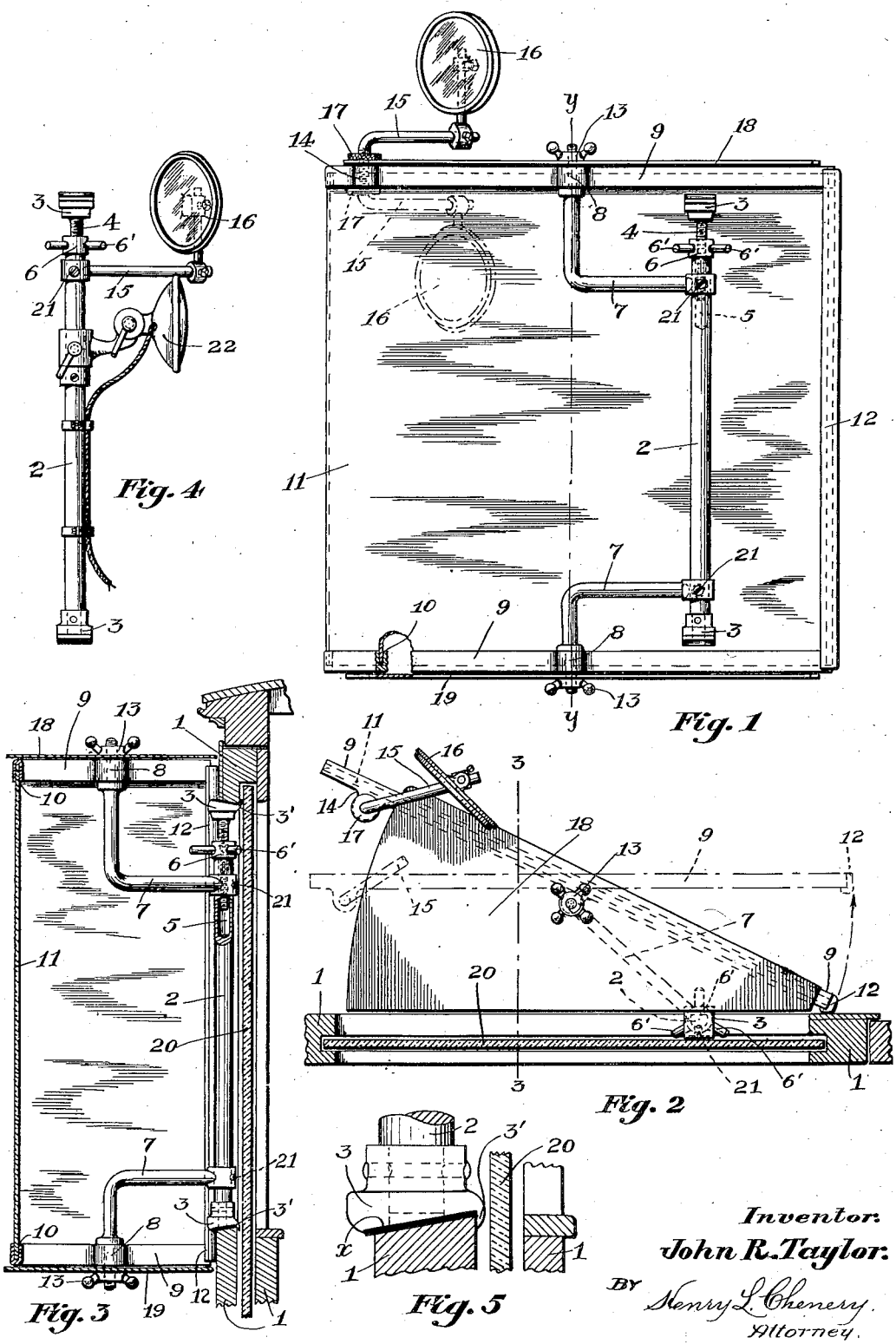

1,768,300

UNITED STATES PATENT OFFICE

JOHN R. TAYLOR, OF PORTLAND, MAINE

WIND AND RAIN DEFLECTOR FOR MOTOR VEHICLE WINDOWS

Application filed May 20, 1929. Serial No. 364,673.

My invention relates, in general terms, to motor vehicle accessory equipment and particularly to devices employed to protect the occupants of the vehicle from the direct force of the wind, rain or sleet when the vehicle is moving over the highways.

The primary object of my invention is to provide a quickly attachable or detachable wind deflector which does not require a single operation to be performed on any portion of the vehicle—not even to the extent of making a single hole therein in order to attach the device thereto.

Another object is to provide means whereby the device may, if desired, operate to allow a current of air to enter the interior of the vehicle, and in greater or less amounts.

Another object is to provide an arrangement whereby the air current cannot pass over the top or under the bottom of the deflector, into the vehicle—accomplished by supplying plates which cover the top and bottom of the space between the deflector and the window of the vehicle.

A further object pertains to the facilities provided by means of which other accessories—such as a mirror or spot light, may be conveniently mounted on the apparatus.

And a still further and appealing object resides in the feature which insures the device against theft when the simple precaution is taken to close the window within the frame of which the parts are mounted—it being very difficult, if not impossible to open a closed window from outside the vehicle.

The character of the invention may best be understood by reference to the description found in the following specification when taken in connection with the accompanying drawing in which is disclosed an embodiment which, at the present time, I consider preferable to other possible forms in which the invention might be carried out.

In the drawing, in which like reference characters are employed to identify corresponding parts in all the different views therein,—

Fig. 1 is a side elevation of my wind deflector;

Fig. 2 is a plan view thereof;

Fig. 3 is a section taken on line 3—3, Fig. 2, but showing the principal elements in the device in full end elevation;

Fig. 4 is an elevation of the deflector standard equipped with a spot light and mirror, and Fig. 5 is a view of the thrust plate shown on an enlarged scale.

Referring to the drawing, 1 represents the window frame of a motor vehicle door, between the upper and lower portions of which is mounted the deflector standard 2.

On each end of the standard is a thrust plate 3, the one on the bottom end being fixed to the standard and the one on the top end provided with a screw threaded shank 4 which slidably engages the hole 5 in the top end of the standard.

An adjusting nut 6 having outwardly projecting spokes 6' thereon, has screw threaded engagement with the shank 4, and when the standard is in place in the window frame, serves to forcibly bind the two thrust plates 3 against the window frame parts.

In Fig. 5 an enlarged view of one of the thrust plates is shown. The face of the plate lying adjacent the window frame is preferably covered with a thin course of soft material, such as a rubber or felt pad $x$, this being done to prevent marring the painted surface of the window frame. On the outer face of the plate is a flat, wedge shape claw 3' which overhangs the inner ledge of the window frame and prevents outward displacement of the apparatus from the vehicle.

Fixed on the standard are two angular brackets 7, 7, the vertical portions of which make pivotal connections, respectively, with the lateral projections 8, 8 on the channel members 9, 9. Within the grooves 10 of the channel members and extending from one to the other thereof, is a glass deflector plate 11. The glass may be cemented in the grooves, pinned in or otherwise secured, but regardless of whatever method is adopted, it is secured in the channels in such a manner that more than ordinary force is required to detach it from the binding members.

As shown in Fig. 3 and in full lines in Fig.

2, the deflector plate is disposed at an angle to the side of the window frame, the front vertical edge of the plate being covered by a weather strip of rubber or felt material 12 which contacts with the forward side of the window frame and provides an air-excluding joint between the parts.

In this position of the plate the wind is deflected outwardly—away from the vehicle, but on certain occasions, such as on very hot days, it might be desirable to admit rather than exclude the air from the vehicle interior. In this event, the spoked lock nuts 13 are slightly relaxed and the deflector swung on its pivotal center line y—y, until the desired opening at its forward end is reached, then by again tightening the nuts the plate remains in this open position—illustrated in Fig. 2 by dot and dash lines.

Near the rearward end of the upper channel member 9 is a laterally projecting boss 14 in which the arm 15, which supports the mirror 16, has screw threaded engagement. The lock-nut 17 provides means to hold the arm in any desired horizontal position.

Operators of vehicles generally consider it necessary when driving closed cars to keep the window nearest which they sit while driving, open at all times so as to be better able to give signals and also to hear what is transpiring on the outside—such as officers' signals or commands.

During a rain or sleet storm, or when the wind is unusually gusty, it is of considerable advantage to secure not only the protection offered by the deflector plate itself but also to derive from the apparatus still further protection by enclosing, at the top and bottom, the space between the deflector plate and the window frame.

The operator and occupants of the vehicle are then quite completely shielded from the effects of the elements, and furthermore, the operator himself still has the opportunity of being able to thrust his arm out of the open window for the purpose of signalling, as the space at the rearward end of the deflector is open to the outside.

To attain this last mentioned object I provide plates 18 and 19, securing them to the top and bottom channel members, respectively, by means of the nuts 13. It is obvious that when the top plate 18 is in place the mirror 16, when disposed in the position shown in full lines Fig. 1, is ineffective; but it will also be clearly seen that the arm 15 may be reversed—that is, placed on the under side of the plate (18), as illustrated in dot and dash lines Fig. 1, in which case the mirror is protected from rain, sleet or snow.

The employment of the plates 18 and 19 for the purpose mentioned might, perhaps, be considered in the nature of an emergency measure, as their use is somewhat more essential in inclement or stormy weather than in fine. They may be quickly attached or detached, however, so that no serious objection to their use, on the score of the labor involved in their application, can be made.

One of the difficulties with which all motorists have to contend is the liability of the theft of small, detachable motor vehicle accessories. In constructing my apparatus I have borne this fact in mind and have provided facilities by taking advantage of which makes it practically impossible for the thief to appropriate the device intact— or in other words, to steal it without tearing it to pieces in the act of detaching it from the vehicle.

By reference to Figs. 2 and 3 it will be observed that the ends of the spokes 6', projecting from the nut 6, are disposed in close relation to the window pane 20 when the window of the vehicle is closed. The nut 6, therefore, cannot be actuated so as to loose the standard 2, and as all motor vehicle windows are raised and lowered from the inside, the chances are very remote that the thief will be able to lower the pane 20 from the outside—and if the doors are locked he has no access to the interior of the vehicle.

The set screws 21, which secure the angular brackets 7 to the standard 2, are also inaccessible while the window is closed as they are disposed on the side of the bracket hub adjacent the pane 20. Furthermore, the channel members 9 are so fixedly attached to the deflector plate that breakage of the latter would be bound to follow any attempt to detach them.

So, to all intents and purposes, the apparatus is as nearly proof against petty thievery as it is possible to make it and retain its simplified construction.

There is considerable demand for some device, especially adaptable for motor trucks, by which a spot light and a mirror may be installed thereon without resort to boring of holes or providing more or less elaborate paraphernalia. In Fig. 4 I illustrate my standard element 2 equipped with both a spot light 22 and a mirror 16, and in this instance the standard 2 is secured to the frame of the vehicle window in a manner identical with that when it supported the deflector plate 11.

The advantages of this device, especially with respect to its convenient-installing characteristics will be appreciated by those conversant with the usual difficulties encountered and the labor involved in applying many of the extensively used accessories for motor vehicles.

In the present instance, the fact that the deflector may be installed or attached to the vehicle without in the least defacing or marring any portion thereof will appeal to many, and the operative features, the benefits accruing to the occupants of the motor vehicle from its use, and the fact that in appearance it is an ornament instead of otherwise, makes my device, it is believed, a commendable and desirable piece of motor vehicle equipment.

What I claim and desire to secure by Letters Patent is:

1. A wind and rain deflector for motor vehicle windows, comprising in combination with the window frame therefor, a vertical standard member, a thrust plate secured at each end thereof, means whereby a strain in opposite directions may be exerted on said thrust plates tending to hold them firmly against opposite portions of said window frame, two angular brackets secured on said standard member—one near the top and the other near the bottom thereof, a channel member pivotally secured on each of said angular brackets, a glass deflector plate secured in and interjacent said channel members, and two plates secured, respectively, on the said top and on the said bottom channel member and adapted to enclose the upper and lower sides of the space included between the said deflector plate and the said window frame.

2. In a device of the character described, adapted to be attached to the window frame of a motor vehicle, the combination with the window pane therefor, of a vertical standard member, a thrust plate fixed on the lower end of said standard member, and adapted to seat on the inside, lower portion of said window frame, a thrust plate having a threaded shank thereon slidably engaging a hole in the upper end of said standard and adapted to seat on the inner, upper portion of said window frame, a nut having screw-threaded engagement with the shank of said second mentioned thrust plate and adapted, when rotated, to bring a strain tending to move said thrust plates in opposite directions, and a plurality of spokes on said nut, so disposed thereon, that when said window pane is raised, closing the window of the vehicle, said nut will be held against rotation by the impingement of said spokes on said pane.

In testimony whereof I affix my signature.

JOHN R. TAYLOR.